United States Patent
Lieh

(10) Patent No.: US 11,745,825 B2
(45) Date of Patent: Sep. 5, 2023

(54) DIRECT-DRIVE BICYCLE

(71) Applicant: Junghsen Lieh, Beavercreek, OH (US)

(72) Inventor: Junghsen Lieh, Beavercreek, OH (US)

(73) Assignee: Junghsen Lieh, Beavercreek, OH (US)

(*) Notice: Subject to any disclaimer, the term of this patent is extended or adjusted under 35 U.S.C. 154(b) by 243 days.

(21) Appl. No.: 17/401,979

(22) Filed: Aug. 13, 2021

(65) Prior Publication Data

US 2023/0051165 A1 Feb. 16, 2023

(51) Int. Cl.
*B62M 1/36* (2013.01)
*B62M 11/00* (2006.01)
*B62K 21/12* (2006.01)
*B62J 45/20* (2020.01)
*B62M 13/04* (2006.01)

(52) U.S. Cl.
CPC ............... *B62M 1/36* (2013.01); *B62J 45/20* (2020.02); *B62K 21/12* (2013.01); *B62M 11/00* (2013.01); *B62M 13/04* (2013.01)

(58) Field of Classification Search
CPC .......... B62M 1/36; B62M 1/38; B62M 11/00; B62K 21/12
See application file for complete search history.

(56) References Cited

U.S. PATENT DOCUMENTS

| 4,583,427 A * | 4/1986 | Blattmann | B62M 11/14 475/297 |
| 4,986,556 A * | 1/1991 | Hartmann | B62M 1/38 280/260 |
| 7,909,716 B2 * | 3/2011 | Lieh | F16H 37/027 474/69 |
| 9,511,821 B2 * | 12/2016 | Go | B62M 11/02 |
| 2016/0185417 A1 * | 6/2016 | Tang | F16D 41/30 280/205 |

* cited by examiner

*Primary Examiner* — Tony H Winner
*Assistant Examiner* — Michael R Stabley
(74) *Attorney, Agent, or Firm* — Birch, Stewart, Kolasch & Birch, LLP

(57) ABSTRACT

A direct-drive bicycle include a bicycle body, which extends to include a front fork. A front wheel is pivotally provided at a tube fixedly provided at the terminal end of the front fork. A shaft passes through the tube. A rotary disc is connected to the shaft. A pedal is provided at each end of the shaft through a connecting rod. A transmission assembly include a rotatable spline shaft provided, a friction wheel slidably provided at the spline shaft to press against a friction disc provided at a side of the front wheel, and a rotating wheel fixed to the spline shaft. The rotary disc is located between the spline shaft and the front wheel, and drives the rotating wheel to change the position where the friction wheel presses against the friction disc. Thus, the front wheel can be directly driven and provides continuously variable transmission.

8 Claims, 7 Drawing Sheets

DIRECT-DRIVE BICYCLE

BACKGROUND OF THE INVENTION

1. Technical Field

The present invention relates to a front-wheel drive bicycle and more particularly to a direct-drive bicycle, which has a simplified structure and provides a continuously variable transmission.

2. Description of Related Art

A conventional bicycle structure includes a bicycle body with a pair of pedals provided under the seat. The pedals are configured to drive a plurality of chainrings. A chain is wound around one sprocket of the chainrings and one of the sprockets at the rear wheel, and a derailleur is provided at the chainrings as well as at the sprockets. When a cyclist pushes the pedals alternately with his/her feet, the chainrings are rotated, and the chain is driven by the corresponding chainring to drive the corresponding sprocket at the rear wheel, making the rear wheel generate a rotating force. The derailleurs can be used to switch between different gear ratios so as to shift. A conventional bicycle, however, has obvious drawbacks. First, the complexity and high precision requirements of the bicycle structure lead to a high cost. Second, the chain may break if too taut and therefore must keep properly loose; a loose chain is nevertheless likely to slip off. One conventional solution to the aforesaid drawbacks is to provide a bicycle with a drive shaft instead of a chain, and such a bicycle has bevel gears mounted at the pedals and the rear wheel. With such a design, the problem of chain slipping can be avoided. However, the power transmission through a drive shaft still has other obvious drawbacks. The major drawback is that gear ratios have a relatively small range. If a larger range of gear ratios is desired, the weight of the entire bicycle structure has to be increased significantly. By using a direct-drive front wheel that provides a continuously variable transmission, the present invention could overcome the drawbacks in the prior art that the bicycle structure may be cumbersome, and may only provide an overly small range of gear ratios. Specifically, the present invention intends to use a design applied with a direct-drive front wheel to replace the chain driving mechanism used in conventional bicycles.

BRIEF SUMMARY OF THE INVENTION

The present invention aims to solve the technical problem regarding the aforesaid drawbacks of the prior art by providing a direct-drive bicycle.

The present invention provides a direct-drive bicycle that includes a bicycle body, a transmission assembly, and a control device. The bicycle body extends to include a front fork. A tube is fixedly provided at the terminal end of the front fork. A front wheel is pivotally provided at the tube. A shaft passes through the tube and has two ends. A pedal is provided at each of the ends of the shaft through a connecting rod. The shaft is also connected to a rotary disc. A friction disc is fixedly provided on a side of the front wheel. The transmission assembly includes a spline shaft, a friction wheel, and a rotating wheel. The spline shaft is rotatable, and is mounted at the front fork. The spline shaft has a plurality of grooves recessed into a surface thereof, wherein the grooves extend in the axial direction of the spline shaft. A friction wheel is slidably provided around the grooves, and presses against the friction disc. The rotating wheel is fixed on the spline shaft. The rotary disc is located between the front wheel and the spline shaft, and is configured to drive the rotating wheel to rotate. The control device includes a bifurcated pushing member, which is slidably provided at the front fork. The bifurcated pushing member has two projecting portions respectively adjacent to two opposite sides of the friction wheel. The bifurcated pushing member is slidable in a direction in parallel to the axial direction of the spline shaft so as to move the friction wheel, whereby to change the position where the friction wheel presses against the friction disc. The pedals are configured to sequentially drive the rotary disc, the rotating wheel, the spline shaft, the friction wheel, and the friction disc to directly drive the front wheel, and therefore provide a continuously variable transmission.

In an embodiment, a box is integrally formed on the front fork. The box and the friction disc are on a same side of the front fork. The box is configured to cover the transmission assembly, and has an opening formed thereon facing the friction disc. The box has a fixed shaft support, which is adjacent to the center of the front wheel, and a adjustable shaft support, which is adjacent to the periphery of the front wheel. The spline shaft has two ends, which are respectively inserted into the fixed shaft support and the adjustable shaft support.

In an embodiment, a spring has one end pushing against the adjustable shaft support, and another end fixed to the box through a bolt. The bolt can be tightened to push the spline shaft slightly toward the friction disc, whereby to increase the friction between the friction wheel and the friction disc.

In an embodiment, the box has a slide slot formed thereon, and the bifurcated pushing member is slidably provided in the slide slot. Each of the two projecting portions of the bifurcated pushing member is connected to a pulling cord. The two pulling cords are connected to a speed regulator located at the bicycle body, and can be controlled by the speed regulator to move the bifurcated pushing member.

In an embodiment, the bicycle body include a rear fork. A rear wheel is pivotally provided at the rear fork. A seat is provided on the bicycle body between the front wheel and the rear wheel. The rear fork is connected to a handle, and the handle extends to two opposite lateral sides of the seat in a manner that the handle is adapted to be held in a natural posture.

In an embodiment, a gear carrier is provided on the bicycle body above the rear wheel. The gear carrier has a first gear and a second gear provided therein, wherein the first gear and the second gear mesh with each other. The rear fork is connected to a center of the first gear, and the handle is connected to a center of the second gear.

In an embodiment, the rotary disc is pivotally provided on the shaft via a one-way bearing, whereby the shaft only drives the rotary disc in one direction.

In an embodiment, the rotary disc drives the rotating wheel to rotate through friction.

The main objective of the present invention is to provide a simplified structure which could directly drive the front wheel and provide a continuously variable transmission. To achieve this objective, the pedals are sequentially configured to drive the rotary disc, the rotating wheel, the spline shaft, the friction wheel, and the friction disc. In addition, the bifurcated pushing member is configured to move the friction wheel, whereby to change the position where the friction wheel presses against the friction disc.

DETAILED DESCRIPTION OF THE INVENTION

Figure 1:
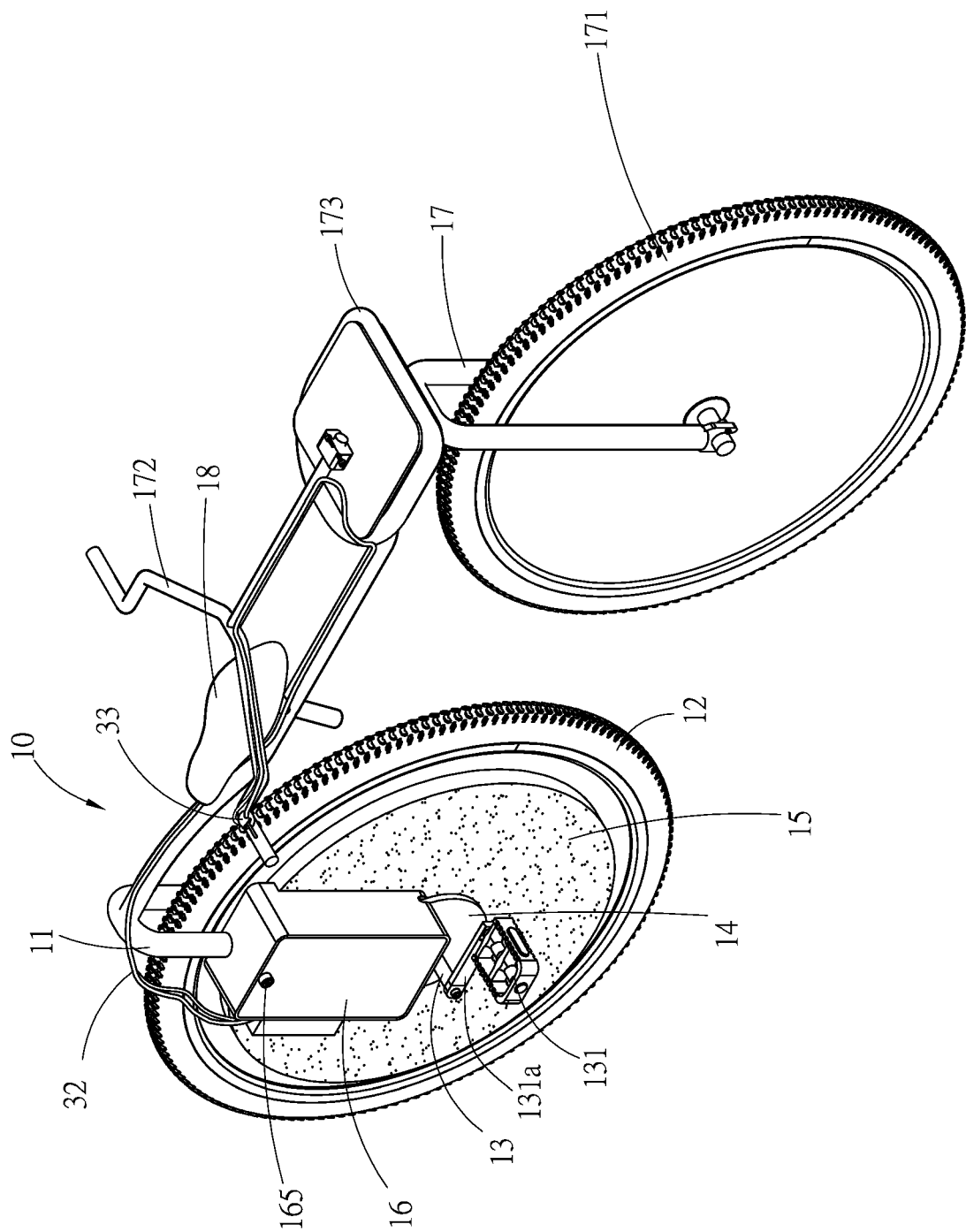
FIG. 1 is a perspective view of an embodiment of the present invention.
Figure 2:
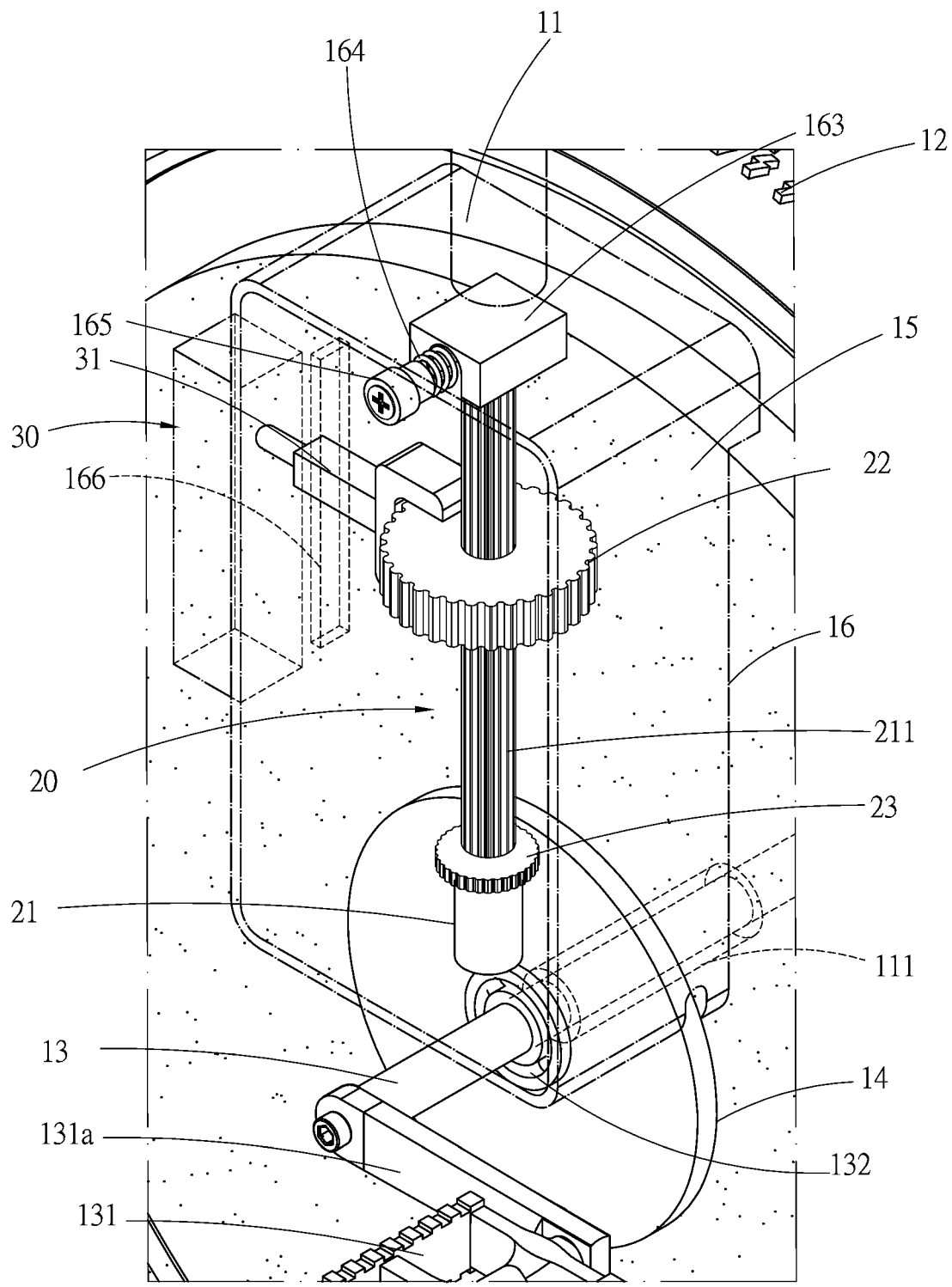
FIG. 2 is a perspective view of the driving structure of the embodiment of the present invention.
Figure 3:
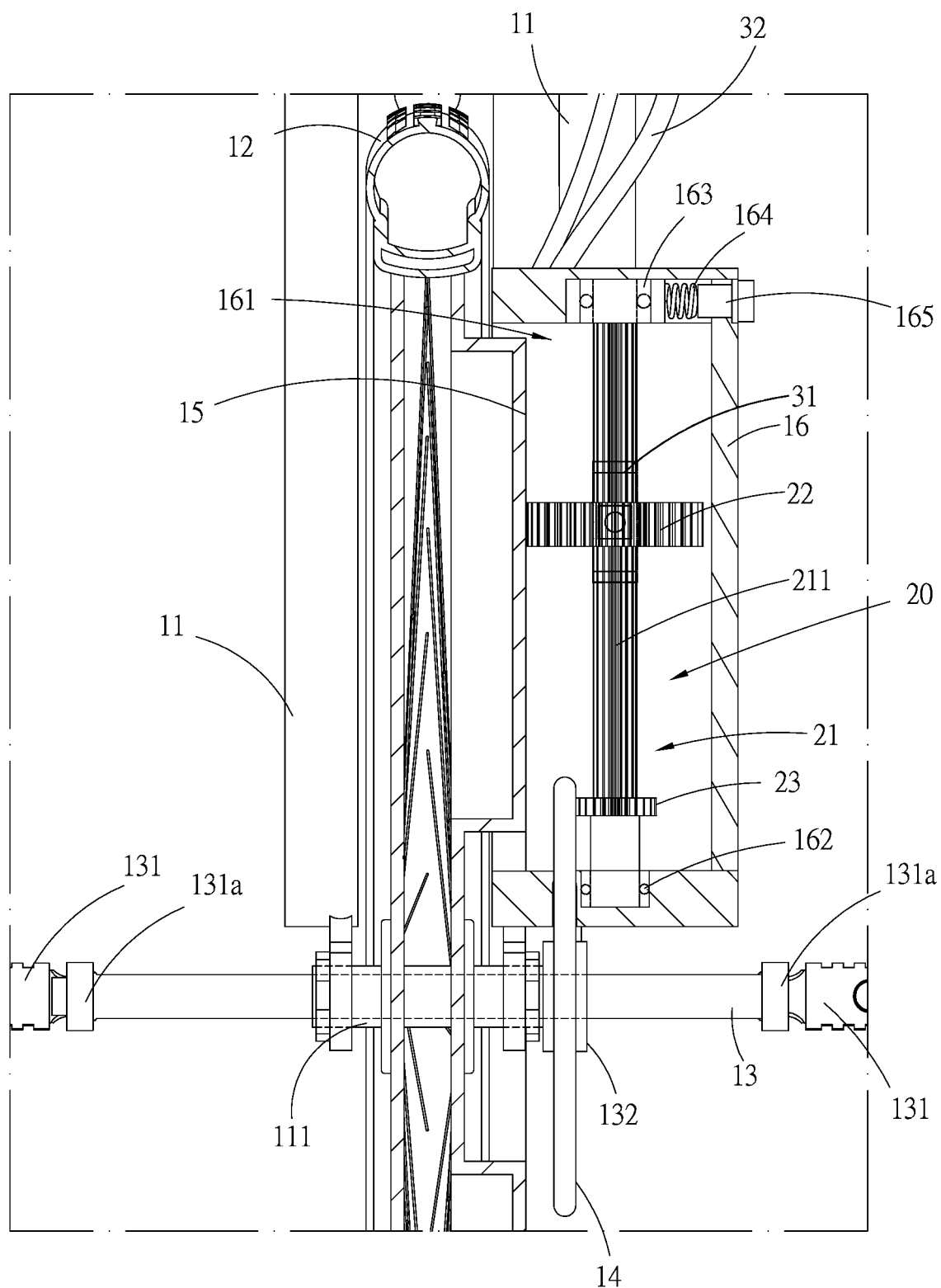
FIG. 3 is a sectional view of the driving structure of the embodiment of the present invention.
Figure 4:
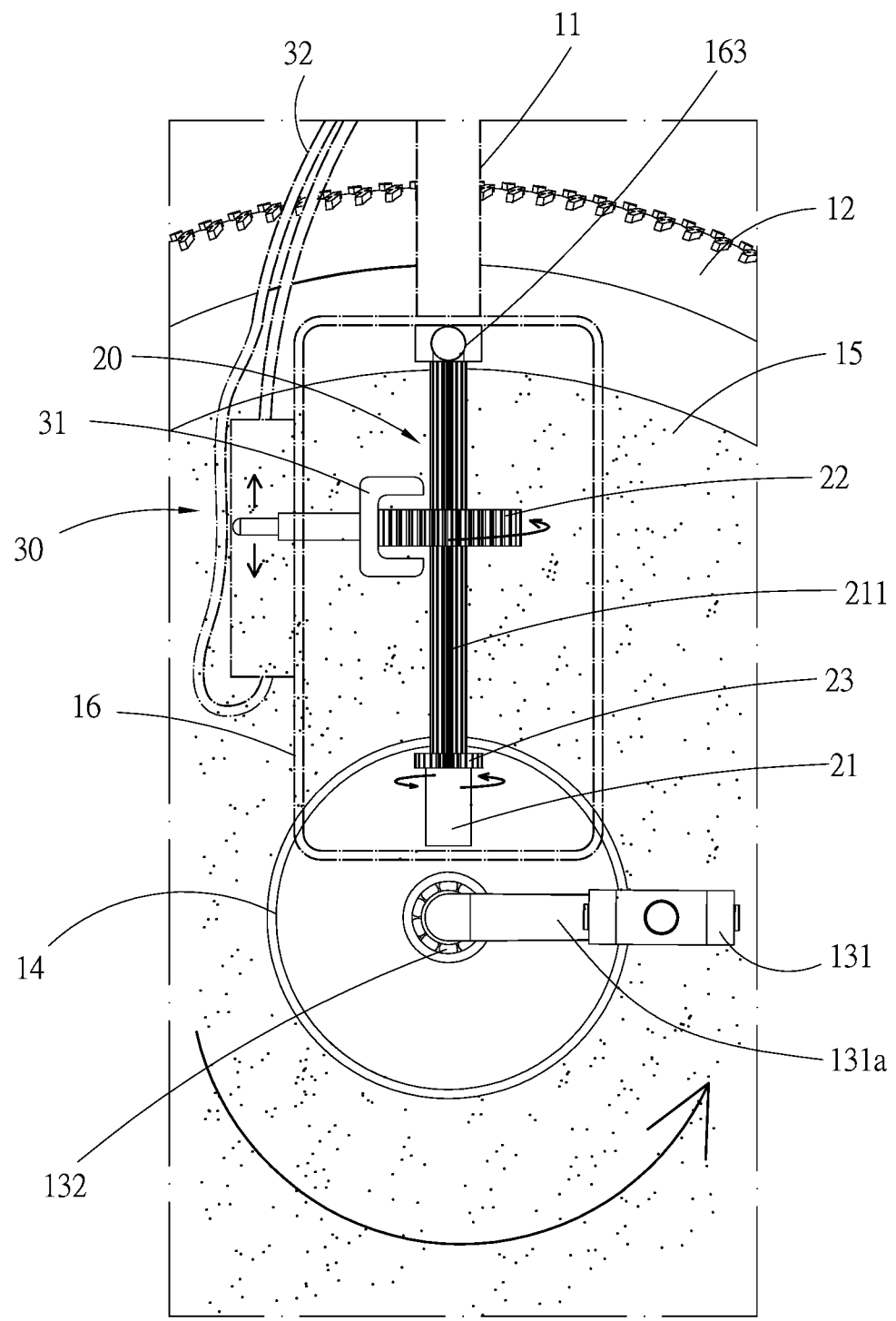
FIG. 4 is a schematic view showing the condition of the driving structure of the embodiment of the present invention when in use.

The following detailed description will be best understood by referring to the accompanying drawings, which have been briefly described above. As shown in FIG. 1, FIG. 2, and FIG. 3, a direct-drive bicycle includes a bicycle body 10, a transmission assembly 20, and a control device 30. The bicycle body 10 extends to include a front fork 11. A tube 111 is fixedly provided at the terminal end of the front fork 11. A front wheel 12 is pivotally provided at the tube 111. A shaft 13 passes through the tube 111, and each of two ends of the shaft 13 is connected to a connecting rod 131a, to which a pedal 131 is attached. The shaft 13 is also mounted with a rotary disc 14. More specifically, the rotary disc 14 is pivotally provided on the shaft 13 via one-way bearing 132 so that the shaft 13 can only drive the rotary disc 14 to rotate in one direction. A friction disc 15 is fixedly provided on a side of the front wheel 12. The transmission assembly 20 includes a spline shaft 21, a friction wheel 22, and a rotating wheel 23. The spline shaft 21 is rotatable, and is mounted at the front fork 11. The spline shaft 21 has a plurality of grooves 211 recessed into a surface thereof, and the grooves 211 extend in the axial direction of the spline shaft 21. The friction wheel 22 is slidably engaged with the grooves 211, and presses against the friction disc 15. The rotating wheel 23 fits over the spline shaft 21. The rotary disc 14 is located between the front wheel 12 and the spline shaft 21, and is configured to drive the rotating wheel 23. More specifically, the rotary disc 14 drives the rotating wheel 23 through friction. In other embodiments, the rotary disc 14 could also drive the rotating wheel 23 through gear or sprocket teeth instead. A box 16 is integrally formed on the front fork 11, and is on the same side with the friction disc 15. The box 16 is configured to cover the transmission assembly 20 and has an opening 161 formed thereon, wherein the opening 161 faces the friction disc 15. The box 16 is provided with a fixed shaft support 162 adjacent to the center of the front wheel 12. The box 16 is also provided with an adjustable shaft support 163 adjacent to the periphery of the front wheel 12. Two ends of the spline shaft 21 are inserted into the fixed shaft support 162 and the adjustable shaft support 163, respectively. The adjustable shaft support 163 is pressed by an end of a spring 164, and another end of the spring 164 is fixed to the box 16 through a bolt 165. By tightening the bolt 165, the spline shaft 21 can be pushed toward the friction disc 15 slightly so as to increase the friction between the friction wheel 22 and the friction disc 15. The control device 30 include a bifurcated pushing member 31 slidably provided at the front fork 11. The bifurcated pushing member 31 has two projecting portions respectively adjacent to two opposite sides of the friction wheel 22. The box 16 has a slide slot 166 provided thereon, and the bifurcated pushing member 31 is slidably provided in the slide slot 166. Each of the two projecting portions of the bifurcated pushing member 31 is connected to a pulling cord 32. The two pulling cords 32 are provided with a speed regulator 33 located at the bicycle body 10. The speed regulator 33 can be used to control the pulling cords 32 and thereby pull the bifurcated pushing member 31, causing the bifurcated pushing member 31 to slide in a direction parallel to the axial direction of the spline shaft 21 and thus move the friction wheel 22 to change the position where the friction wheel 22 presses against the friction disc 15. By using the pedals 131 to sequentially drive the rotary disc 14, the rotating wheel 23, the spline shaft 21, the friction wheel 22, and the friction disc 15, the front wheel 12 could be directly driven and provide a continuously variable transmission.

The operation of direct driving will be explained in more detail below in reference to FIG. 1 to FIG. 4. The bicycle provided in the present invention is propelled by feet. The bicycle body 10 is provided with the front fork 11, which is located on the front side in the cycling direction. The tube 111 is provided to support the front fork 11. Therefore, with bearings provided between the front wheel 12 and the tube 111, the front wheel 12 can rotate freely about the tube 111. The friction disc 15 is fixed on one side of the front wheel 12. The shaft 13 passes through the tube 111, and each of the two ends of the shaft 13 is provided with the corresponding pedal 131 via the corresponding connecting rod 131a. The rotary disc 14 is mounted around the shaft 13 via one-way bearing 132. The spline shaft 21 of the transmission assembly 20 is inserted into and lies between the fixed shaft support 162 and the adjustable shaft support 163, wherein the spline shaft 21 allows the friction wheel 22 to slide along the grooves 211. The friction wheel 22 projects out of the opening 161 and presses against the friction disc 15 on the front wheel 12. The rotating wheel 23 is fixed on the spline shaft 21. The rotary disc 14 extends into the box 16 in such a way that the rotating wheel 23 presses against the rotary disc 14, thereby allowing the rotary disc 14 to drive the rotating wheel 23. It is worth noting that the rotary disc 14 is provided between the front wheel 12 and the spline shaft 21, and therefore presses against the rotating wheel 23 with its outside surface. When the pedals 131 are pushed forward by feet, the rotary disc 14 is driven to drive the rotating wheel 23. More specifically, the rotary disc 14 drives the rotating wheel 23 to transmit power in a tangential direction. Since the rotating wheel 23 is fixed to the spline shaft 21 and the friction wheel 22 meshes with the grooves 211 of the spline shaft 21, therefore the rotating wheel 23, the spline shaft 21, and the friction wheel 22 are all rotated in the same direction. The friction wheel 22, in turn, drives the friction disc 15 through frictional contact, whereby the front wheel 12 is driven to rotate forward. As a result, the front wheel 12 could be driven directly while cycling. The aforesaid transmission mechanism is simpler than the prior art, and further shortens the power transmission distance. When the pedals 131 are pushed backward by feet, only the one-way bearing 132 will rotate in the reverse direction, which means that pushing the pedals 131 backward will not engage the front wheel 12.

The mechanism of providing a continuously variable transmission will be explained in more detail below in reference to FIG. 1 to FIG. 4 again. The bifurcated pushing member 31 of the control device 30 is slidably provided in the slide slot 166 of the box 16. Each of the two projecting portions of the bifurcated pushing member 31 is connected to one of the pulling cords 32. The two pulling cords 32 can be fixedly arranged along the front fork 11, the bicycle body 10, a handle 172, and then connected to the speed regulator 33 located at the handle 172. In this way, the speed regulator 33 can be used to control the pulling cords 32, whereby to move the bifurcated pushing member 31. The bifurcated pushing member 31 will, in turn, make the friction wheel 22 slide along the grooves 211. By pushing the friction wheel 22, the bifurcated pushing member 31 can change the position where the friction wheel 22 presses against the friction disc 15. Therefore, when the friction wheel 22 is close to the inner edge of the friction disc 15, the front wheel 12 will be rotated at a relatively high speed, creating a relatively low torque; when the friction wheel 22 is close to an outer edge of the friction disc 15, the front wheel 12 will be rotated at a relatively low speed, creating a relatively high torque. Thus, such a simple structure provides a continuously variable transmission. According to the above description, the present invention discloses a simplified power transmission structure that not only drives the front wheel 12 directly, but also provides a continuously variable transmission. A practical bicycle driving method can be therefore provided.

Figure 5:
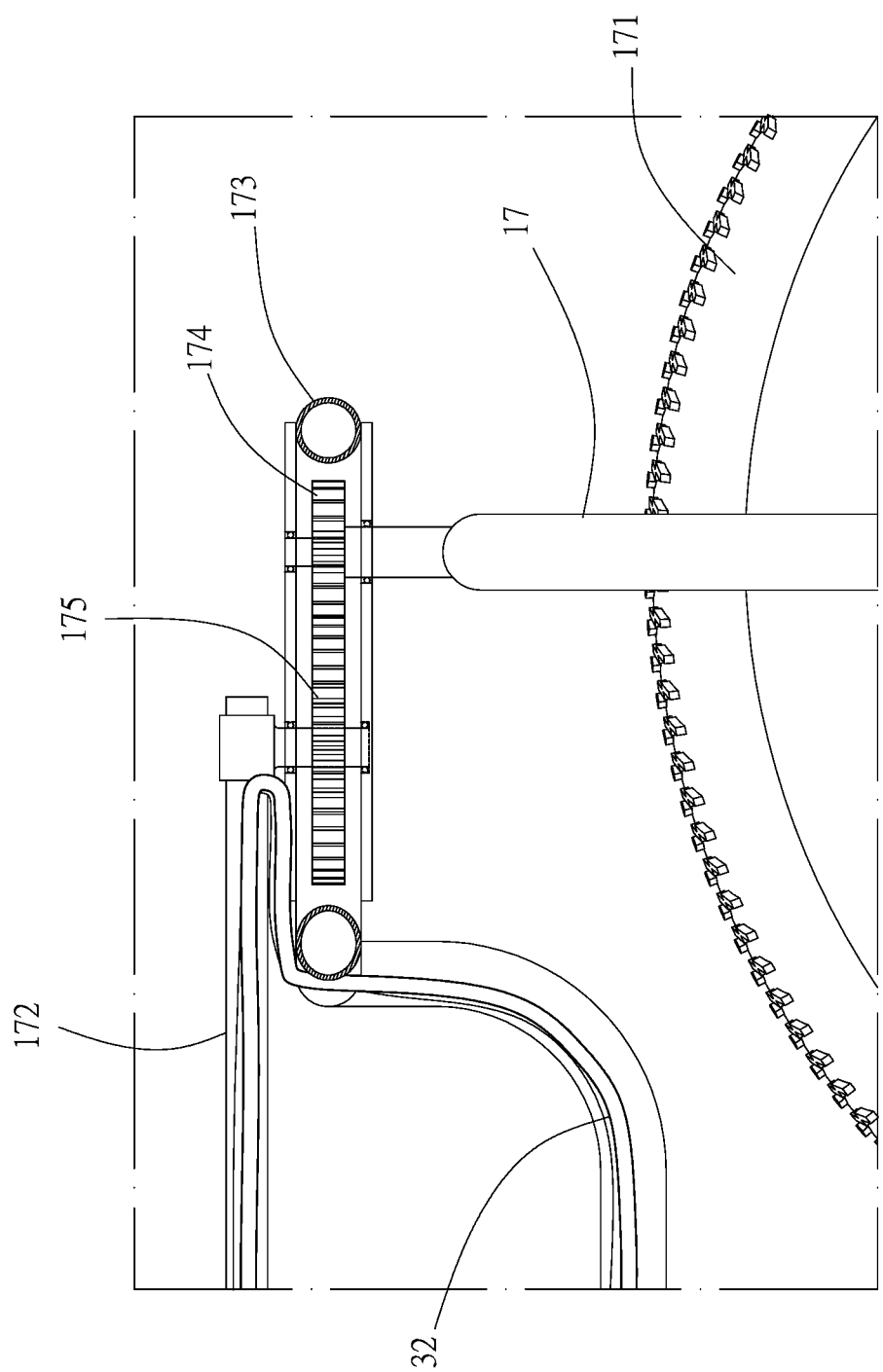
FIG. 5 is a sectional view of the steering structure of the embodiment of the present invention.
Figure 6:
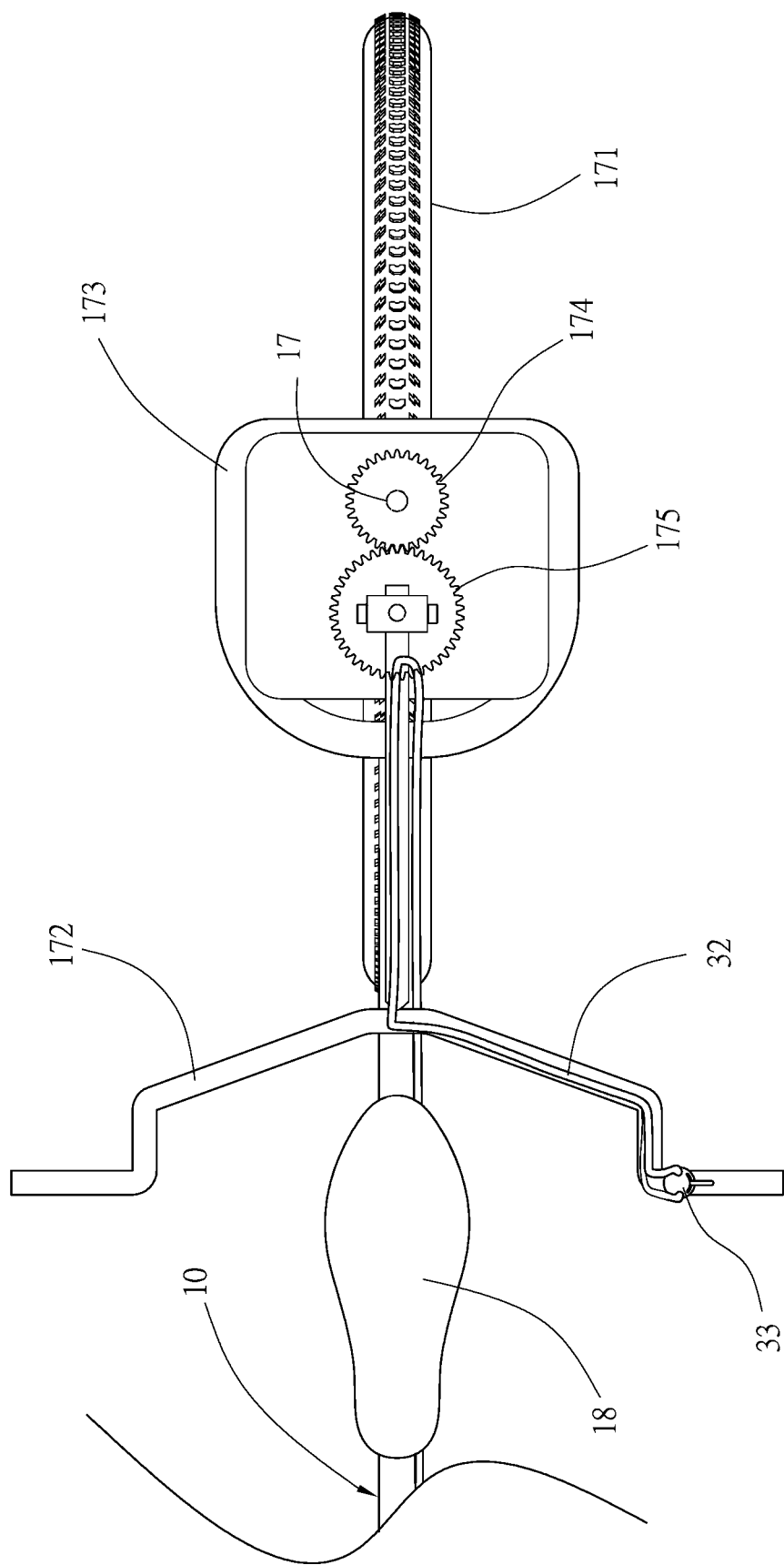
FIG. 6 is a schematic view showing the condition of the steering structure of the embodiment of the present invention when in use.
Figure 7:
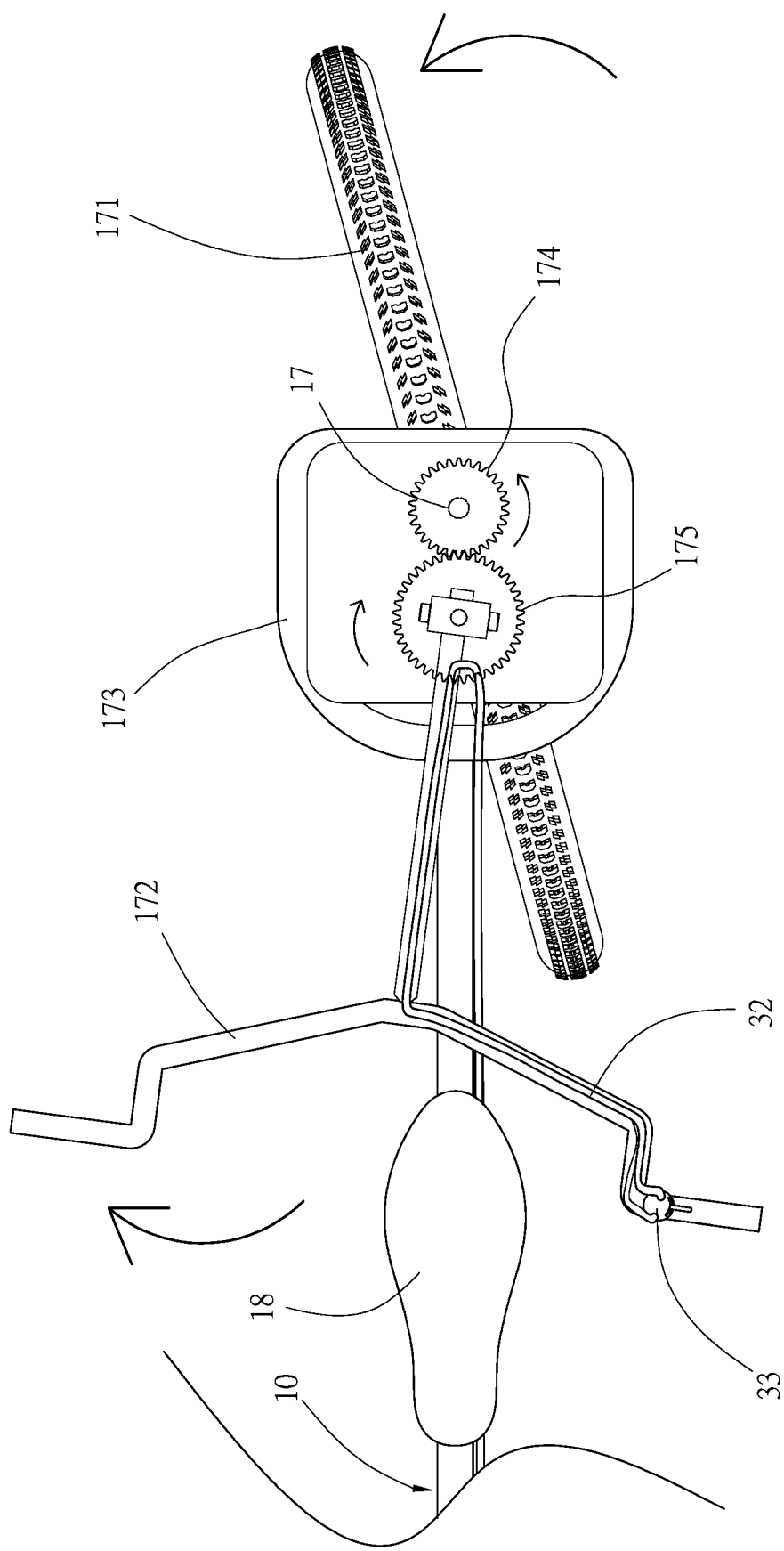
FIG. 7 is another schematic view, which also shows the condition of the steering structure of the embodiment of the present invention when in use.

As shown in FIG. 5 to FIG. 7, in reference to FIG. 1, the bicycle body 10 further includes a rear fork 17 and a rear wheel 171 pivotally provided at the rear fork 17. The bicycle body 10 is also provided with a seat 18 between the front wheel 12 and the rear wheel 171. The rear fork 17 is connected to the handle 172. The handle 172 extends to two opposite lateral sides of the seat 18, whereby a cyclist sitting on the seat 18 can hold the handle 172 with two naturally lowered hands. In this way, the bicycle body 10 can be steered easily. In addition, a gear carrier 173 is further fixedly provided on the bicycle body 10 above the rear wheel 171. A first gear 174 and a second gear 175 are provided in the gear carrier 173, and mesh with each other. The rear fork 17 is connected to the center of the first gear 174, and the handle 172 is connected to the center of the second gear 175. When a cyclist holds the handle 172 with both hands and turns the handle 172 to the left or right, the second gear 175 in the gear carrier 173 will be rotated to drive the first gear 174 to rotate in an opposite direction. The rear wheel 171 connected to the first gear 174 will rotate in a direction opposite to the direction in which the handle 172 is turned, allowing the bicycle to be steered in response to the turning of the handle 172. Thus, it is the front wheel 12 that drives the bicycle, and it is the rear wheel 171 that steers the bicycle.

What is claimed is:

1. A direct-drive bicycle, comprising:
    a bicycle body, which extends to include a front fork, wherein a tube is fixedly provided at the terminal end of the front fork; a front wheel is pivotally provided at the tube; a shaft passes through the tube and has two ends; a pedal is provided at each of the ends of the shaft through a connecting rod; the shaft is connected to a rotary disc; a friction disc is fixedly provided on a side of the front wheel;
    a transmission assembly comprising a spline shaft, a friction wheel, and a rotating wheel, wherein the spline shaft is rotatable, and is mounted at the front fork; the spline shaft has a plurality of grooves recessed into a surface thereof, wherein the grooves extend in the axial direction of the spline shaft; the friction wheel is slidably provided around the grooves, and presses against the friction disc; the rotating wheel is fixed on the spline shaft; the rotary disc is located between the front wheel and the spline shaft, and is configured to drive the rotating wheel to rotate; and
    a control device comprising a bifurcated pushing member, which is slidably provided at the front fork, wherein the bifurcated pushing member has two projecting portions respectively adjacent to two opposite sides of the friction wheel; the bifurcated pushing member is slidable in a direction in parallel to the axial direction of the spline shaft so as to move the friction wheel, whereby to change the position where the friction wheel presses against the friction disc;
    wherein the pedals are configured to sequentially drive the rotary disc, the rotating wheel, the spline shaft, the friction wheel, and the friction disc to directly drive the front wheel, and therefore provide continuously variable transmission effect.

2. The direct-drive bicycle of claim 1, wherein a box is integrally formed on the front fork; the box and the friction disc are on a same side of the front fork; the box is configured to cover the transmission assembly, and has an opening formed there on facing the friction disc; the box has a fixed shaft support, which is adjacent to the center of the front wheel, and an adjustable shaft support, which is adjacent to the periphery of the front wheel; the spline shaft has two ends, which are respectively inserted into the fixed shaft support and the adjustable shaft support.

3. The direct-drive bicycle of claim 2, wherein the adjustable shaft support is pressed by an end of a spring; another end of the spring is fixed to the box through a bolt; the bolt is able to be tightened to push the spline shaft slightly toward the friction disc, increasing a friction between the friction wheel and the friction disc.

4. The direct-drive bicycle of claim 2, wherein the box has a slide slot formed thereon, and the bifurcated pushing member is slidably provided in the slide slot; each of the two projecting portions of the bifurcated pushing member is connected to a pulling cord; the two pulling cords are connect to a speed regulator located at the bicycle body, and the pulling cords are controllable by the speed regulator to move the bifurcated pushing member.

5. The direct-drive bicycle of claim 1, wherein the bicycle body comprises a rear fork; a rear wheel is pivotally provided at the rear fork; a seat is provided on the bicycle body between the front wheel and the rear wheel; the rear fork is connected to a handle, and the handle extends to two opposite lateral sides of the seat in a manner that the handle is adapted to be held in a natural posture.

6. The direct-drive bicycle of claim 5, wherein a gear carrier is provided on the bicycle body above the rear wheel; the gear carrier has a first gear and a second gear provided therein, wherein the first gear and the second gear mesh with each other; the rear fork is connected to a center of the first gear, and the handle is connected to a center of the second gear.

7. The direct-drive bicycle of claim 1, wherein the rotary disc is pivotally provided on the shaft via a one-way bearing, whereby the shaft only drives the rotary disc in one direction.

8. The direct-drive bicycle of claim 7, wherein the rotary disc drives the rotating wheel to rotate through friction.

\* \* \* \* \*